United States Patent
Chen

(10) Patent No.: US 11,601,822 B2
(45) Date of Patent: Mar. 7, 2023

(54) RANDOM ACCESS METHOD AND COMMUNICATIONS DEVICE

(71) Applicant: VIVO MOBILE COMMUNICATION CO., LTD., Guangdong (CN)

(72) Inventor: Li Chen, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 194 days.

(21) Appl. No.: 17/094,594

(22) Filed: Nov. 10, 2020

(65) Prior Publication Data

US 2021/0058799 A1 Feb. 25, 2021

Related U.S. Application Data

(63) Continuation of application No. PCT/CN2019/085105, filed on Apr. 30, 2019.

(30) Foreign Application Priority Data

May 10, 2018 (CN) .......................... 201810444645.2

(51) Int. Cl.
*H04W 16/28* (2009.01)
*H04W 76/27* (2018.01)
*H04W 74/08* (2009.01)

(52) U.S. Cl.
CPC ....... *H04W 16/28* (2013.01); *H04W 74/0833* (2013.01); *H04W 76/27* (2018.02)

(58) Field of Classification Search
CPC ........... H04W 74/006; H04W 72/1284; H04W 74/004; H04W 74/0833; H04W 16/28; H04W 76/27; H04B 7/0408; H04B 7/0695; H04B 7/0617; H04B 7/063; H04B 7/0632
See application file for complete search history.

(56) References Cited

U.S. PATENT DOCUMENTS

| | | | |
|---|---|---|---|
| 2013/0301567 A1 | 11/2013 | Jeong et al. | |
| 2014/0376466 A1 | 12/2014 | Jeong et al. | |
| 2018/0219605 A1 | 8/2018 | Davydov et al. | |
| 2019/0182805 A1* | 6/2019 | Zhu | H04B 7/0408 |
| 2019/0215888 A1* | 7/2019 | Cirik | H04B 7/0695 |

FOREIGN PATENT DOCUMENTS

| | | |
|---|---|---|
| CN | 104285385 A | 1/2015 |
| CN | 106358216 A | 1/2017 |
| CN | 106900075 A | 6/2017 |
| CN | 106922033 A | 7/2017 |
| CN | 107852220 A | 3/2018 |
| KR | 10-2016-0081755 A | 7/2016 |

(Continued)

OTHER PUBLICATIONS

CN Office Action in Application No. 201810444645.2 dated Feb. 19, 2021.

(Continued)

*Primary Examiner* — Anez C Ebrahim
(74) *Attorney, Agent, or Firm* — Maschoff Brennan

(57) ABSTRACT

This disclosure provides a random access method and a communications device. The method includes: transmitting a message in a random access process by using a target beam in selectable beams, where the message in the random access process is an Msg1, an Msg2, an Msg3, or an Msg4.

20 Claims, 4 Drawing Sheets

(56) References Cited

FOREIGN PATENT DOCUMENTS

| KR | 10-2018-0034612 A | 4/2018 |
|---|---|---|
| WO | 2015/042866 A1 | 4/2015 |

OTHER PUBLICATIONS

CN Office Action in Application No. 201810444645.2 dated Sep. 29, 2020.
Written Opinion and International Search Report in Application No. PCT/CN2019/085105 dated Nov. 19, 2020.
European Search Report issued in corresponding application 19799805.7, dated Jun. 11, 2021.
Sony, Consideration on Beam Reporting in RACH Procedure, R1-1720454, 3GPP TSG RAN WG1 Meeting #91, Reno, USA, Nov. 27-Dec. 1, 2017.
InterDigital, Inc., Remaining Issues on Beam Management, R1-1802620, 3GPP TSG RAN WG1 Meeting #92, Athens, Greece, Feb. 26-Mar. 2, 2018.
Meditek, Inc. Remaining Details in RACH Procedure, R1-1805524, 3GPP TSG RAN WG1 Meeting #92bis, Sanya, China, Apr. 16-20, 2018.
Huawei et al., "Remaing issues on RA resource selection for multi-beam operations," 33GPP TSG-RAN WG2 Meeting 101bis, R2-1805894, Apr. 16-20, 2018, pp. 1-4.
Astri et al., "Discussion on response beam selection in indication-based paging," 3GPP TSC-RAN WG2#99bis, R2-1710985, Oct. 9-13, 2017, pp. 1-5.
LG Electronics Inc., "Random Access procedure for multi-beam operation," 3GPP TSG-RAN WG2 Meeting #99bis, R2-1711608, Oct. 9-13, 2017, pp. 1-4.
Ericsson, "Remaining details on RACH procedure," 3GPP TSG-RAN WG1 Meeting#91, R2-1720941, Nov. 27-Dec. 1, 2017, pp. 2-19.
Huawei et al., "Baseline handover procedure for inter gNB handover in NR," 3GPP TSG-RAN WG2 Adhoc#2 on NR, R2-1706705, Jun. 27-39, 2017, pp. 2-8.
Qualcomm Incorporated, "Remaining details on RACH procedure," 3GPP TSG-RAN WG1 Meeting RAN 1 AH 1801, R1-180051, Jan. 22-26, 2018, pp. 2-13.
Japanese Office Action in corresponding JP Application No. 2020-563703, dated Jan. 11, 2022.
Korean Office Action in corresponding KR Application No. 10-2020-7035655, dated Feb. 23, 2022.
"Consideration of random access procedure in multiple and single beam scenarios" 3GPP TSG-RAN WG2 97bis meeting, Intel Corporation, R2-1703445, Apr. 3, 2017.
Reconsideration Report in Application No. 2022016404 Dated Dec. 8, 2022.

* cited by examiner

RANDOM ACCESS METHOD AND COMMUNICATIONS DEVICE

CROSS-REFERENCE TO RELATED APPLICATIONS

This application is a continuation of PCT Application No. PCT/CN2019/085105 filed on Apr. 30, 2019, which claims priority to Chinese Patent Application No. 201810444645.2 filed in China on May 10, 2018, which is incorporated herein by reference in its entirety.

TECHNICAL FIELD

This disclosure relates to the field of communications technologies, and in particular, to a random access method and a communications device.

BACKGROUND

With the development of mobile communications technologies, in future mobile communications systems such as the 5th generation (5th-Generation, 5G) mobile communications system, high-frequency communication and the massive antenna technology are introduced to reach the goal of a 20 Gbps downlink transmission rate and a 10 Gbps uplink transmission rate. In high-frequency communication, a wider system bandwidth and a smaller antenna size can be provided to facilitate deployment of massive antennas in base stations and user equipment (User Equipment, UE). High-frequency communication features disadvantages of large path loss, proneness to interference, and fragile links. However, the massive antenna technology can provide a large antenna gain. Therefore, combination of the high-frequency communication and massive antennas is an inevitable trend of the future mobile communications systems (such as 5G).

In the future mobile communications system, for a random access process, multi-beam (Beam) in the massive antennas can also be used for receiving and sending messages in the random access process. However, in the related art, there is no solution related to beam-based receiving and sending of messages in a random access process.

SUMMARY

Embodiments of this disclosure provide a random access method and a communications device, so as to regulate beam selection for receiving and sending messages in a random access process.

According to a first aspect, an embodiment of this disclosure provides a random access method. The method includes:

transmitting a message in a random access process by using a target beam in selectable beams, where the message in the random access process is an Msg1, an Msg2, an Msg3, or an Msg4.

According to a second aspect, an embodiment of this disclosure further provides a communications device. The communications device includes:

a transmission module, configured to transmit a message in a random access process by using a target beam in selectable beams, where the message in the random access process is an Msg1, an Msg2, an Msg3, or an Msg4.

According to a third aspect, an embodiment of this disclosure further provides a communications device, including a processor, a memory, and a computer program stored in the memory and capable of running on the processor, where when the computer program is executed by the processor, the steps of the foregoing random access method are implemented.

According to a fourth aspect, an embodiment of this disclosure further provides a computer-readable storage medium, where the computer-readable storage medium stores a computer program. When the computer program is executed by a processor, the steps of the foregoing random access method are implemented.

In the embodiments of this disclosure, the message in the random access process is transmitted by using the target beam in the selectable beams, where the message in the random access process is the Msg1, the Msg2, the Msg3, or the Msg4, thereby implementing beam-based transmission of the messages in the random access process and regulating beam selection for receiving and sending the messages in the random access process.

BRIEF DESCRIPTION OF DRAWINGS

To describe the technical solutions in the embodiments of this disclosure more clearly, the following briefly describes the accompanying drawings for describing the embodiments of this disclosure. Apparently, the accompanying drawings in the following description show merely some embodiments of this disclosure, and persons of ordinary skill in the art may derive other drawings from these accompanying drawings without creative efforts.

DESCRIPTION OF EMBODIMENTS

Figure 1:
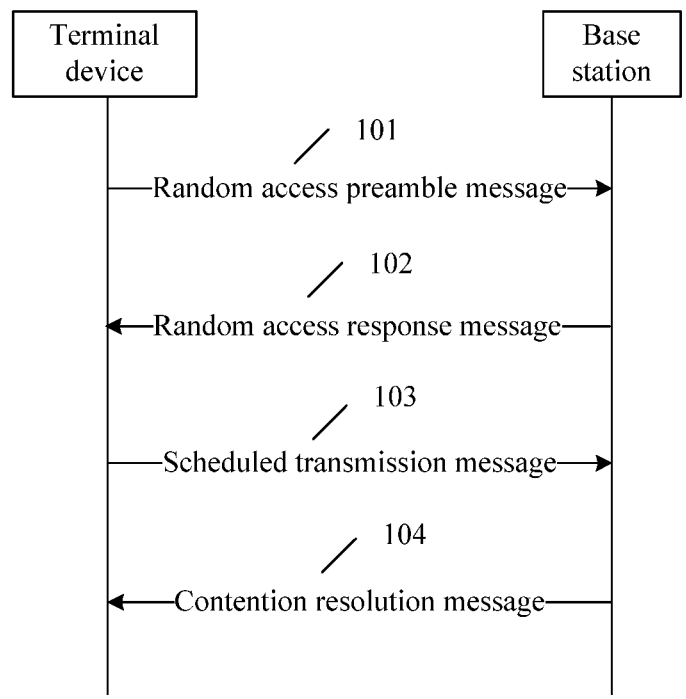
FIG. 1 is a flowchart of a contention-based random access process according to an embodiment of this disclosure.

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of this disclosure without creative efforts shall fall within the protection scope of this disclosure.

In the specification and claims of this application, the terms such as "first" and "second" are intended to distinguish between similar objects but do not necessarily indicate a specific order or sequence. It should be understood that the data termed in such a manner are interchangeable in appropriate cases so that the embodiments of this application can be implemented in other orders than the order illustrated or described in this application. Moreover, the terms "include", "contain" and any other variants mean to cover the non-exclusive inclusion. For example, a process, a method, a system, a product, or a device that includes a list of steps or units is not necessarily limited to those steps or units, but may include other steps or units not expressly listed or inherent to such process, a method, a system, a product, or a device. In addition, in the specification and claims, the use of "and/or" represents presence of at least one of the connected objects, for example, "A and/or B and/or C" indicates that the following seven cases: only A, only B, only C, both A and B, both B and C, both A and C, or all A, B, and C.

For ease of understanding, the following describes some terms involved in the embodiments of this disclosure:

Random access: In the related art such as long term evolution (Long term evolution, LTE) and new radio (New Radio, NR), a random access process needs to be supported to achieve a variety of purposes. Purposes of random access may include at least one of the following:

(1) support for an initial radio resource control (Radio Resource Control, RRC) idle-state user terminal (User Equipment, UE) (Idle UE) to connect to a network;

(2) RRC re-establishment;

(3) handover;

(4) arrival of downlink data with uplink out of synchronization;

(5) arrival of uplink data with uplink out of synchronization;

(6) UE transition from an inactive (inactive) state to an active (active) state;

(7) support for uplink synchronization acquisition for a secondary cell (Secondary Cell, SCell);

(8) request for on-demand system information (on-demand SI); and (9) beam failure recovery.

The foregoing random access may be categorized into contention-based random access and non-contention-based random access. The contention-based random access process mainly includes the following four messages:

a message for transmitting a random access preamble (Random Access Preamble), namely an Msg1;

a message for transmitting a random access response (Random Access Response), namely an Msg2;

a message for transmitting scheduled transmission (Scheduled Transmission), namely an Msg3; and a message for transmitting contention resolution (Contention Resolution), namely an Msg4.

The non-contention-based random access process includes the following two messages:

a message for transmitting a random access preamble (Random Access Preamble), namely an Msg1; and a message for transmitting a random access response (Random Access Response), namely an Msg2.

Specifically, as shown in FIG. 1, the contention-based random access process may mainly include the following steps.

Step 101: A terminal device sends a random access preamble message to a base station.

Specifically, in step 101, the terminal device sends an Msg1 to the base station. The terminal device is UE.

Step 102: The terminal device receives a random access response message sent by the base station.

Specifically, in step 102, the terminal device receives an Msg2 sent by the base station. The base station receives a random access request Msg1 and sends a random access response to the UE.

Step 103: The terminal device sends a scheduled transmission message.

Specifically, in step 103, the terminal device sends an Msg3 to the base station.

Step 104: The terminal device receives a contention resolution message sent by the base station.

Specifically, in step 104, the terminal device receives an Msg4 sent by the base station. The UE may determine based on the Msg4 whether random access is successful.

It should be noted that, in the contention-based random access process, there is a problem that UEs send a same preamble (Preamble) on a same physical random access channel (Physical Random Access Channel, PRACH) resource. Therefore, after receiving the Msg2, the UE further needs to send the Msg3 based on an uplink grant (Uplink Grant, UL Grant) carried in the Msg2. In addition, the UE includes an identifier of the UE in the Msg3, and starts a contention resolution timer (Timer) while sending the Msg3. If the UE receives, before the contention resolution timer expires, the Msg4 sent by the base station, it indicates that contention resolution is successful. It can be understood that because a UE identifier is carried in the Msg4, the UE may determine, based on the UE identifier carried in the Msg4, whether the UE identifier is the Msg4 of the UE.

Figure 2:
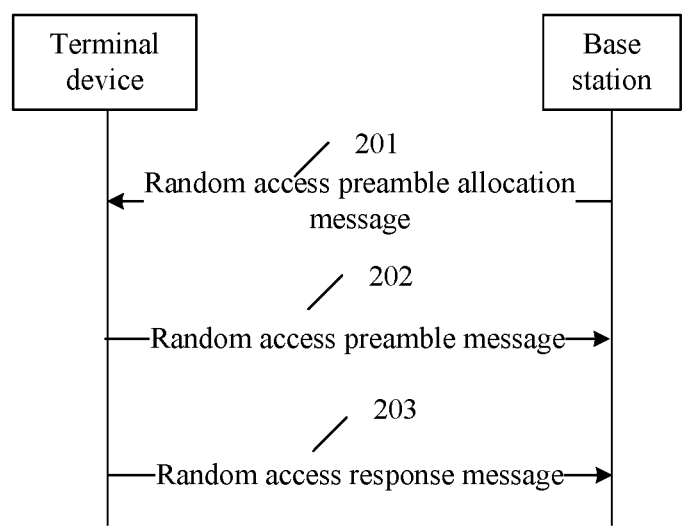
FIG. 2 is a flowchart of a non-contention-based random access process according to an embodiment of this disclosure.

Specifically, as shown in FIG. 2, the non-contention-based random access process may mainly include the following steps.

Step 201: The terminal device receives a random access preamble allocation message sent by the base station.

Specifically, in step 201, the terminal device receives an Msg0 sent by the base station. The base station may allocate the UE a dedicated preamble (Preamble) for non-contention-based random access and a PRACH resource to be used for random access.

Step 202: The terminal device sends a random access preamble message to the base station.

Specifically, in step 202, the terminal device sends an Msg1 to the base station.

Step 203: The terminal device receives a random access response message sent by the base station.

Specifically, in step 203, the terminal device receives an Msg2 sent by the base station.

It should be noted that both the Msg2 in contention-based random access and the Msg2 in non-contention-based random access are a random access response (Random Access Response, RAR). The UE listens to a RAR corresponding to a random access-radio network temporary identity (Random Access-Radio Network Temporary Identity, RA-RNTI) within a RAR window.

In this embodiment of this disclosure, in a case in which high frequency is introduced to a mobile communications system, multi-beam (Beam) may be introduced for information transmission, where each beam may cover one direction. During sending of a preamble (Preamble) for initial access (Initial Access), an uplink beam that has an associative relationship (for example, a beam symmetry relationship) with a beam with good downlink reference signal quality may be selected as a transmit beam. A beam on which the UE may listen to a RAR is a downlink beam that has an associative relationship with the transmit beam of the preamble (Preamble) or a downlink beam that has a quasi co-location (Quasi Co-Location, QCL) relationship with a beam receiving a downlink reference signal.

For example, in a random access process such as handover, re-establishment, or beam failure recovery, a corresponding control resource set (Control Resource Set, CORESET) may be configured for the UE by using a dedicated RRC message. In the CORESET, a corresponding beam, that is, a transmission configuration indicator (Transmission configuration Indicator, TCI) may be configured for the UE. The UE may select a beam to send or receive a message in the random access process, for example, sending a preamble (Preamble) and receiving a RAR.

According to this embodiment of this disclosure, a random access method is provided. A message in the random access process is transmitted by using a target beam in selectable beams, thereby implementing beam-based transmission of the messages in the random access process, and regulating beam selection for receiving and sending the messages in the random access process.

Figure 3:
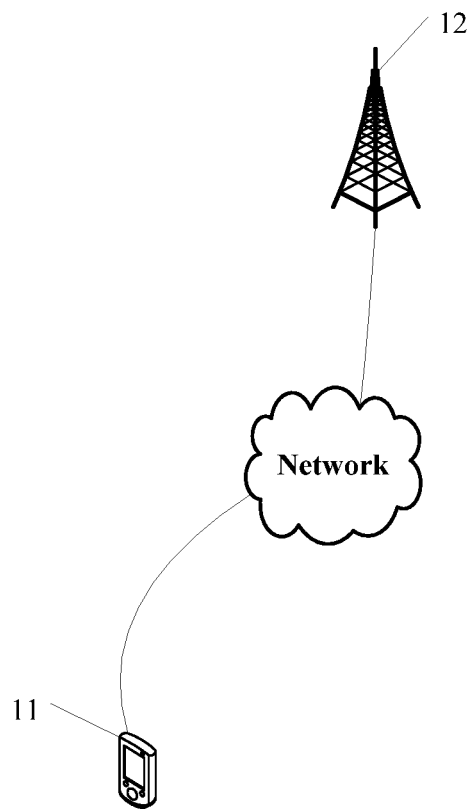
FIG. 3 is a schematic structural diagram of a network to which a random access method is applicable according to an embodiment of this disclosure.

Referring to FIG. 3, FIG. 3 is a schematic structural diagram of a network to which an embodiment of this disclosure is applicable. As shown in FIG. 3, the network includes a terminal device 11 and a network device 12. The terminal device 11 may be a terminal device-side device such as a mobile phone, a tablet personal computer (Tablet Personal Computer), a laptop computer (Laptop Computer), a personal digital assistant (Personal Digital Assistant, PDA), a mobile Internet device (Mobile Internet Device, MID), or a wearable device (Wearable Device). It should be noted that the terminal device 11 is not limited to any specific type in this embodiment of this disclosure. The network device 12 may be a base station, such as a macro base station, an LTE eNB, or a 5G NR NB. The network device 12 may also be a small cell such as a low power node (Low Power Node, LPN) pico or femto, or the network device 12 may be an access point (Access Point, AP). The base station may also be a network node composed of a central unit (Central Unit, CU) and a plurality of transmission reception points (Transmission Reception Point, TRP) managed and controlled by the central unit. It should be noted that the network device 12 is not limited to any specific type in this embodiment of this disclosure. The random access method provided in the embodiments of this disclosure may be executed by the terminal device 11, or may be executed by the network device 12.

Specifically, in an implementation, the terminal device 11 may transmit a message in a random access process by using a target beam in selectable beams, where the message in the random access process is an Msg1, an Msg2, an Msg3, or an Msg4. For example, the terminal device 11 may send the Msg1 to the network device 12 by using the target beam in the selectable beams, or the terminal device 11 may receive, by using the target beam in the selectable beams, the Msg2 sent by the network device 12, or the terminal device 11 may send the Msg3 to the network device 12 by using the target beam in the selectable beams, or the terminal device 11 may receive, by using the target beam in the selectable beams, the Msg4 sent by the network device 12.

In another implementation, the network device 12 may transmit a message in the random access process by using a target beam in the selectable beams, where the message in the random access process is an Msg1, an Msg2, an Msg3, or an Msg4. For example, the network device 12 may receive, by using the target beam in the selectable beams, the Msg1 sent by the terminal device 11, or the network device 12 may send the Msg2 to the terminal device 11 by using the target beam in the selectable beams, or the network device 12 may receive, by using the target beam in the selectable beams, the Msg3 sent by the terminal device 11, or the network device 12 may send the Msg4 to the terminal device 11 by using the target beam in the selectable beams.

It can be understood that when the random access process is a contention-based random access process, the message may be the Msg1, the Msg2, the Msg3 or the Msg4; and when the random access process is a non-contention-based random access process, the message may be the Msg1 or the Msg2. The selectable beams may correspond to a specific to-be-transmitted message. For example, when the message is the Msg1, the selectable beams may include at least one of an uplink beam that has an associative relationship with a downlink beam whose quality of a received downlink reference signal is better than a first threshold, an uplink beam that has an associative relationship with a downlink beam configured in a dedicated radio resource control RRC message, and the like. When the message is the Msg2, the selectable beams may include at least one of a downlink beam that has an associative relationship with an uplink beam sending the Msg1, a downlink beam that has a quasi co-location QCL relationship with the downlink beam whose quality of the received downlink reference signal is better than the first threshold, a downlink beam that is the same as the downlink beam whose quality of the received downlink reference signal is better than the first threshold, and the downlink beam configured in the dedicated radio resource control RRC message.

Optionally, the target beam may be any beam in the selectable beams, or may be a usable highest-priority beam in the selectable beams.

In this embodiment of this disclosure, the terminal device 11 or the network device 12 may transmit a message in the random access process by using the target beam in the selectable beams, thereby implementing beam-based transmission of messages in the random access process, and regulating beam selection for receiving and sending the messages in the random access process.

Figure 4:
FIG. 4 is a flowchart of a random access method according to another embodiment of this disclosure.

Referring to FIG. 4, FIG. 4 is a flowchart of a random access method according to an embodiment of this disclosure. As shown in FIG. 4, the method includes the following steps.

Step 401: Transmit a message in a random access process by using a target beam in selectable beams, where the message in the random access process is an Msg1, an Msg2, an Msg3, or an Msg4.

In this embodiment of this disclosure, when the foregoing step 401 is performed by a terminal device, the foregoing step 401 may be sending the Msg1 to a network device by using the target beam in the selectable beams, or receiving, by using the target beam in the selectable beams, the Msg2 sent by the network device, or sending the Msg3 to the network device by using the target beam in the selectable beams, or receiving, by using the target beam in the selectable beams, the Msg4 sent by the network device. When the network device performs the foregoing step 401, the foregoing step 401 may be receiving, by using the target beam in the selectable beams, the Msg1 sent by the terminal device, or sending the Msg2 to the terminal device 11 by using the target beam in the selectable beams, or receiving, by using the target beam in the selectable beams, the Msg3 sent by the terminal device, or sending the Msg4 to the terminal device by using the target beam in the selectable beams.

Optionally, the selectable beams may correspond to a specific to-be-transmitted message. For example, when the message is the Msg1, the selectable beams may include at least one of an uplink beam that has an associative relationship with a downlink beam whose quality of a received downlink reference signal is better than a first threshold, an uplink beam that has an associative relationship with a downlink beam configured in a dedicated radio resource control RRC message, and the like. When the message is the Msg2, the selectable beams may include at least one of a downlink beam that has an associative relationship with an uplink beam sending the Msg1, a downlink beam that has a quasi co-location QCL relationship with the downlink beam whose quality of the received downlink reference signal is better than the first threshold, a downlink beam that is the same as the downlink beam whose quality of the received downlink reference signal is better than the first threshold, and the downlink beam configured in the dedicated radio resource control RRC message.

Optionally, the target beam may be any beam in the selectable beams, or may be a usable highest-priority beam in the selectable beams. For example, if the selectable beams include a first beam and a second beam, the target beam may be the first beam or the second beam. When the first beam has a higher priority than the second beam, the target beam is the first beam if the first beam is usable, or the target beam is the second beam if the first beam is unusable. It should be noted that when the selectable beams include only the first beam, the target beam may be the first beam, or when the selectable beams include only the second beam, the target beam may be the second beam.

According to the random access method in this embodiment of this disclosure, a message in the random access process is transmitted by using the target beam in the selectable beams, thereby implementing beam-based transmission of messages in the random access process, and regulating beam selection for beam-based receiving and sending of the messages in the random access process.

Optionally, when the message is the Msg1, the selectable beams include the first beam and/or the second beam.

The first beam is an uplink beam that has an associative relationship with the downlink beam whose quality of the received downlink reference signal is better than the first threshold.

The second beam is an uplink beam that has an associative relationship with the downlink beam configured in the dedicated radio resource control RRC message.

In this embodiment of this disclosure, in a case in which the message in the random access process is the Msg1, the selectable beams may include the first beam and/or the second beam. The first threshold may be properly set based on an actual situation. The associative relationship may include a beam symmetric relationship. The dedicated RRC message may be an RRC message specific to a specific random access purpose. For example, when the random access purpose is handover, the dedicated RRC message is an RRC message for handover. When the random access purpose is beam failure recovery, the dedicated RRC message is an RRC message for beam failure recovery. Optionally, the network device may configure a downlink beam in the RRC message.

It can be understood that the first beam and/or the second beam may include one beam or at least two beams.

Optionally, in a case in which the selectable beams include the first beam and the second beam, the target beam may be the first beam or the second beam. If the first beam and the second beam have priorities, the target beam may be a usable higher-priority beam in the first beam and the second beam. For example, when the first beam has a higher priority than the second beam, the target beam is the first beam if the first beam is usable, or the beam is the second beam if the first beam is unusable. Likewise, when the second beam has a higher priority than the first beam, the target beam is the second beam if the second beam is usable, or the beam is the first beam if the second beam is unusable. The beam being usable may means the beam being present.

Optionally, when the selectable beams include only the first beam, the target beam is the first beam. When the selectable beams include only the second beam, the target beam is the second beam.

It should be noted that using the first beam to transmit the Msg1, that is, using the uplink beam that has the associative relationship with the downlink beam whose quality of the received downlink reference signal is better than the first threshold can improve transmission efficiency and transmission accuracy of the Msg1 because of better signal quality. When the second beam is used to transmit the Msg1, that is, using the uplink beam that has the associative relationship with the downlink beam configured in the dedicated radio resource control RRC message, the network device does not need to scan all uplink beams, but directly scans the uplink beam that has the associative relationship with the downlink beam configured in the dedicated radio resource control RRC message to receive the Msg1, thereby improving efficiency of receiving the Msg1.

In this embodiment of this disclosure, when the message is the Msg1, the selectable beams include the first beam and/or the second beam, and the Msg1 may be transmitted by using the target beam in the selectable beams, thereby regulating beam selection for transmitting the Msg1 in the random access process.

Optionally, when the message is the Msg2, the selectable beams include at least one of a third beam, a fourth beam, a fifth beam, and a sixth beam.

The third beam is a downlink beam that has an associative relationship with the uplink beam sending the Msg1.

The fourth beam is a downlink beam that has a quasi co-location QCL relationship with the downlink beam whose quality of the received downlink reference signal is better than the first threshold.

The fifth beam is a downlink beam that is the same as the downlink beam whose quality of the received downlink reference signal is better than the first threshold.

The sixth beam is a downlink beam configured in the dedicated radio resource control RRC message.

In this embodiment of this disclosure, in a case in which the message in the random access process is the Msg2, the selectable beams may include at least one of the third beam, the fourth beam, the fifth beam, and the sixth beam.

Similarly, each of the selectable beams (that is, the third beam, the fourth beam, the fifth beam, and the sixth beam) may include one or at least two beams.

Optionally, in a case in which the selectable beams include at least two of the third beam, the fourth beam, the fifth beam, and the sixth beam, the target beam may be any beam in the selectable beams. If beams in the selectable beams have priorities, the target beam may be a usable highest-priority beam in the selectable beams.

For example, the selectable beams include the third beam, the fourth beam, the fifth beam, and the sixth beam. When the fourth beam has a highest priority and the third beam, the fifth beam, and the sixth beam have priorities in descending order, the target beam is the fourth beam if the fourth beam is usable; the target beam is the third beam if the fourth beam is unusable but the third beam is usable; detection on the fifth beam continues if the third beam is unusable; and so on. When the fourth beam has the highest priority, and the third beam, the fifth beam, and the sixth beam have the same priority, the target beam is the fourth beam if the fourth beam is usable, and the target beam may be the third beam, the fifth beam, or the sixth beam if the fourth beam is unusable.

It should be noted that the beam being usable may mean the beam being present.

Optionally, in a case in which the selectable beams include only one of the third beam, the fourth beam, the fifth beam, and the sixth beam, the target beam may be the only included beam in the selectable beams. For example, when the selectable beams include only the third beam, the target beam is the third beam; when the selectable beams include only the fourth beam, the target beam is the fourth beam; when the selectable beams include only the fifth beam, the target beam is the fifth beam; or when the selectable beams include only the sixth beam, the target beam is the sixth beam.

It should be noted that when the fourth beam or the fifth beam is used to transmit the Msg2, transmission efficiency and transmission accuracy of the Msg2 can be improved because of better signal quality In this embodiment of this disclosure, when the message is the Msg2, the selectable beams may include at least one of the third beam, the fourth beam, the fifth beam, and the sixth beam, and the Msg2 may be transmitted by using the target beam in the selectable beams, thereby regulating beam selection for transmitting the Msg2 in the random access process.

Optionally, the target beam is the sixth beam when the sixth beam is usable and has an associative relationship with the uplink beam sending the Msg1, or when the sixth beam is usable and has a QCL relationship with the downlink beam whose quality of the received downlink reference signal is better than the first threshold, or when the sixth beam is usable and is the same as the downlink beam whose quality of the received downlink reference signal is better than the first threshold; otherwise, the target beam is the third beam, the fourth beam, or the fifth beam.

In this embodiment of this disclosure, the sixth beam usable may refer to the uplink beam configured in the dedicated RRC message.

Specifically, in a case in which the sixth beam is usable and the sixth beam has an associative relationship with the uplink beam sending the Msg1, the target beam is the sixth beam; or in a case in which the sixth beam is usable and has a QCL relationship with the downlink beam whose quality of the received downlink reference signal is better than the first threshold, the target beam is the sixth beam; or in a case in which the sixth beam is usable and the sixth beam is the same as the downlink beam whose quality of the received downlink reference signal is better than the first threshold, the target beam is the sixth beam; otherwise, the target beam is the third beam, the fourth beam, or the fifth beam.

For example, in a case in which the sixth beam is unusable, the target beam may be the third beam, the fourth beam, or the fifth beam; or in a case in which the sixth beam is usable and the sixth beam has no associative relationship with the uplink beam sending the Msg1, the target beam may be the third beam, the fourth beam, or the fifth beam; or in a case in which the sixth beam is usable and the sixth beam has no QCL relationship with the downlink beam whose quality of the received downlink reference signal is better than the first threshold, the target beam may be the third beam, the fourth beam, or the fifth beam; or in a case in which the sixth beam is usable and the sixth beam is different from the downlink beam whose quality of the received downlink reference signal is better than the first threshold, the target beam may be the third beam, the fourth beam, or the fifth beam.

Optionally, when the message is the Msg3, the selectable beams include at least one of a seventh beam, an eighth beam, a ninth beam, a tenth beam, an eleventh beam, and a twelfth beam.

The seventh beam is an uplink beam that is the same as the uplink beam sending the Msg1.

The eighth beam is an uplink beam that has a quasi co-location QCL relationship with the uplink beam sending the Msg1.

The ninth beam is an uplink beam indicated in the Msg2.

The tenth beam is an uplink beam that has an associative relationship with the downlink beam configured in the dedicated radio resource control RRC message.

The eleventh beam is an uplink beam configured in the dedicated radio resource control RRC message.

The twelfth beam is an uplink beam that has an associative relationship with a downlink beam receiving the Msg2.

In this embodiment of this disclosure, the network device may indicate an uplink beam to the terminal device by using the Msg2, or the network device may configure a beam for the terminal device by using the RRC message. For example, the network device may configure an uplink beam and/or a downlink beam for the terminal device by using the RRC message.

Specifically, in a case in which the message in the random access process is the Msg3, the selectable beams may include at least one of the seventh beam, the eighth beam, the ninth beam, the tenth beam, the eleventh beam, and the twelfth beam.

Similarly, each of the selectable beams (that is, the seventh beam, the eighth beam, the ninth beam, the tenth beam, the eleventh beam, or the twelfth beam) may include one or at least two beams.

Optionally, in a case in which the selectable beams include at least two of the seventh beam, the eighth beam, the ninth beam, the tenth beam, the eleventh beam, and the twelfth beam, the target beam may be any beam in the selectable beams. If beams in the selectable beams have priorities, the target beam may be a usable highest-priority beam in the selectable beams.

For example, the selectable beams include the seventh beam, the eighth beam, the ninth beam, the tenth beam, the eleventh beam, and the twelfth beam, and priorities of the seventh beam, the eighth beam, the ninth beam, the tenth beam, the eleventh beam, and the twelfth beam are in ascending order. The target beam is the twelfth beam if the twelfth beam is usable; the target beam is the eleventh beam if the twelfth beam is unusable but the eleventh beam is usable; otherwise, detection on the tenth beam continues; and so on.

It can be understood that when there are at least two usable highest-priority beams in the selectable beams, the target beam may be any one of the at least two beams.

Optionally, in a case in which the selectable beams include only one of the seventh beam, the eighth beam, the ninth beam, the tenth beam, the eleventh beam, and the twelfth beam, the target beam may be the only included beam of the selectable beams. For example, when the selectable beams include only the seventh beam, the target beam is the seventh beam. When the selectable beams include only the eighth beam, the target beam is the eighth beam.

It should be noted that when the ninth beam, the tenth beam, or the eleventh beam is used to transmit the Msg3, the network device does not need to scan all the uplink beams, but may directly scan the uplink beam indicated in the Msg2, or directly scan the uplink beam that has the associative relationship with the downlink beam configured in the dedicated radio resource control RRC message, or directly scan the uplink beam configured in the dedicated radio resource control RRC message, to receive the Msg3, thereby improving receiving efficiency of the Msg3.

In this embodiment of this disclosure, when the message is the Msg3, the selectable beams may include at least one of the seventh beam, the eighth beam, the ninth beam, the tenth beam, the eleventh beam, and the twelfth beam, and the Msg3 may be transmitted by using the target beam in the selectable beams, thereby regulating beam selection for transmitting the Msg3 in the random access process.

Optionally, when the message is the Msg4, the selectable beams include at least one of a third beam, a fourth beam, a fifth beam, a sixth beam, a thirteenth beam, a fourteenth beam, a fifteenth beam, a sixteenth beam, and a seventeenth beam.

The third beam is a downlink beam that has an associative relationship with the uplink beam sending the Msg1.

The fourth beam is a downlink beam that has a quasi co-location QCL relationship with the downlink beam whose quality of the received downlink reference signal is better than the first threshold.

The fifth beam is a downlink beam that is the same as the downlink beam whose quality of the received downlink reference signal is better than the first threshold.

The sixth beam is a downlink beam configured in the dedicated radio resource control RRC message.

The thirteenth beam is a downlink beam indicated in the Msg2.

The fourteenth beam is a downlink beam receiving the Msg2.

The fifteenth beam is a downlink beam that has a quasi co-location QCL relationship with the downlink beam receiving the Msg2.

The sixteenth beam is a downlink beam that has an associative relationship with an uplink beam sending the Msg3.

The seventeenth beam is a downlink beam that has an associative relationship with the uplink beam configured in the dedicated radio resource control RRC message.

In this embodiment of this disclosure, the network device may indicate a downlink beam to the terminal device by using the Msg2, where the Msg2 may explicitly or implicitly indicate an uplink beam and/or a downlink beam. The network device may alternatively configure a beam for the terminal device by using an RRC message. For example, the network device may configure an uplink beam and/or a downlink beam for the terminal device by using the RRC message.

Specifically, when the message in the random access process is the Msg4, the selectable beams may include at least one of the third beam, the fourth beam, the fifth beam, the sixth beam, the thirteenth beam, the fourteenth beam, the fifteenth beam, the sixteenth beam, and the seventeenth beam.

Similarly, each of the selectable beams (that is, the third beam, the fourth beam, the fifth beam, the sixth beam, the thirteenth beam, the fourteenth beam, the fifteenth beam, the sixteenth beam, or the seventeenth beam) may include one or at least two beams.

Optionally, when the selectable beams include at least two of the third beam, the fourth beam, the fifth beam, the sixth beam, the thirteenth beam, the fourteenth beam, the fifteenth beam, the sixteenth beam, and the seventeenth beam, the target beam may be any beam in the selectable beams. If beams in the selectable beams have priorities, the target beam may be a usable highest-priority beam in the selectable beams.

For example, the selectable beams include the third beam, the fourth beam, the fifth beam, the sixth beam, the thirteenth beam, the fourteenth beam, the fifteenth beam, the sixteenth beam, and the seventeenth beam, and priorities of the third beam, the fourth beam, the fifth beam, the sixth beam, the thirteenth beam, the fourteenth beam, the fifteenth beam, the sixteenth beam, and the seventeenth beam are in descending order. The target beam is the third beam if the third beam is usable; the target beam is the fourth beam if the third beam is unusable but the fourth beam is usable; otherwise, detection on the fifth beam continues; and so on.

It can be understood that when there are at least two usable highest-priority beams in the selectable beams, the target beam may be any one of the at least two beams.

Optionally, when the selectable beams include only one of the third beam, the fourth beam, the fifth beam, the sixth beam, the thirteenth beam, the fourteenth beam, the fifteenth beam, the sixteenth beam, and the seventeenth beam, the target beam may be the only included beam in the selectable beams. For example, when the selectable beams include only the third beam, the target beam is the third beam, and when the selectable beams include only the fourth beam, the target beam is the fourth beam.

In this embodiment of this disclosure, when the message is the Msg4, the selectable beams may include at least one of the third beam, the fourth beam, the fifth beam, the sixth beam, the thirteenth beam, the fourteenth beam, the fifteenth beam, the sixteenth beam, and the seventeenth beam, and the Msg4 may be transmitted by using the target beam in the selectable beams, thereby regulating beam selection for transmitting the Msg4 in the random access process.

Optionally, the target beam is the sixth beam when the sixth beam is usable and has an associative relationship with the uplink beam sending the Msg1, or when the sixth beam is usable and has a QCL relationship with the downlink beam whose quality of the received downlink reference signal is better than the first threshold, or when the sixth beam is usable and is the same as the downlink beam whose quality of the received downlink reference signal is better than the first threshold; otherwise, the target beam is the third beam, the fourth beam, the fifth beam, the thirteenth beam, the fourteenth beam, the fifteenth beam, the sixteenth beam, or the seventeenth beam.

In this embodiment of this disclosure, the sixth beam usable may refer to an uplink beam configured in the dedicated RRC message.

Specifically, in a case in which the sixth beam is usable and the sixth beam has an associative relationship with the uplink beam sending the Msg1, the target beam is the sixth beam; or in a case in which the sixth beam is usable and has a QCL relationship with the downlink beam whose quality of the received downlink reference signal is better than the first threshold, the target beam is the sixth beam; or in a case in which the sixth beam is usable and the sixth beam is the same as the downlink beam whose quality of the received downlink reference signal is better than the first threshold, and the target beam is the sixth beam; otherwise, the target beam is the third beam, the fourth beam, the fifth beam, the thirteenth beam, the fourteenth beam, the fifteenth beam, the sixteenth beam, or the seventeenth beam.

For example, when the sixth beam is unusable, or when the sixth beam is usable but the sixth beam has no associative relationship with the uplink beam sending the Msg1, or when the sixth beam is usable but the sixth beam has no QCL relationship with the downlink beam whose quality of the received downlink reference signal is better than the first threshold, or when the sixth beam is usable but the sixth beam is different from the downlink beam whose quality of the received downlink reference signal is better than the first threshold, the target beam is the third beam, the fourth beam, the fifth beam, the thirteenth beam, the fourteenth beam, the fifteenth beam, the sixteenth beam, or the seventeenth beam.

Optionally, the target beam is a usable highest-priority beam in the selectable beams.

For ease of understanding, the following describes this embodiment of this disclosure by using examples:

Example a: In a case in which the selectable beams include only the first beam, if the first beam is usable, the target beam is the first beam; or if the first beam is unusable, the transmission is ended.

Example b: In a case in which the selectable beams include the first beam and the second beam, when the first beam has a higher priority than the second beam, if the first beam is usable, the target beam is the first beam; or if the first beam is unusable, the target beam is the second beam. Similarly, when the second beam has a higher priority than the first beam, if the second beam is usable, the target beam is the second beam; or if the second beam is unusable, the target beam is the first beam.

Example c: In a case in which the selectable beams include the third beam, the fourth beam, the fifth beam, and the sixth beam, when the priorities of the third beam, the fourth beam, the fifth beam, and the sixth beam are in ascending order, the target beam is the third beam if the third beam is usable; the target beam is the fourth beam if the third beam is unusable but the fourth beam is usable; otherwise, detection on the fifth beam continues; and so on.

In this embodiment of this disclosure, the target beam is a usable highest-priority beam in the selectable beams, which can improve a success rate of message transmission in the random access process.

Optionally, the selectable beams include a beam determined based on a beam that is indicated to the terminal device by the network device by using the Msg2.

In this embodiment of this disclosure, the beam indicated to the terminal device by the network device by using the Msg2 may include an uplink beam and/or a downlink beam. Specifically, the network device may indicate the uplink beam and/or the downlink beam to the terminal device by using the Msg2, so that the terminal device may transmit a message based on the uplink beam and/or the downlink beam indicated in the Msg2.

Optionally, the Msg2 may explicitly or implicitly indicate the uplink beam and/or the downlink beam.

It can be understood that when the terminal device transmits a message by using the uplink beam indicated in the Msg2, the network device may directly scan the uplink beam indicated in the Msg2, without the need to scan all uplink beams to receive the message transmitted by the terminal device, thereby improving message receiving efficiency.

Optionally, the selectable beams include a beam determined based on a beam that is configured for the terminal device by the network device by using a dedicated radio resource control RRC message.

In this embodiment of this disclosure, the beam determined by the network device based on the beam configured for the terminal device by using the RRC message may include at least one of the beam configured for the terminal device by the network device by using the RRC message and a beam that has an associative relationship with the beam configured for the terminal device by using the RRC message by the network device.

In this embodiment of this disclosure, the network device may configure a beam for the terminal device by using the RRC message, for example, configure a beam (for example, an uplink beam and/or a downlink beam) for the terminal device by using the RRC message, so that the terminal device may transmit a message based on the beam configured in the RRC message or based on a beam that has an associative relationship with the beam configured in the RRC message.

It can be understood that when the terminal device transmits the message by using an uplink beam that is determined based on the beam configured for the terminal device by the network device by using the RRC message, the network device may directly scan the uplink beam that is determined based on the beam configured in the RRC message, without the need to scan all the uplink beams to receive the message transmitted by the terminal device, thereby improving message receiving efficiency.

Figure 5:
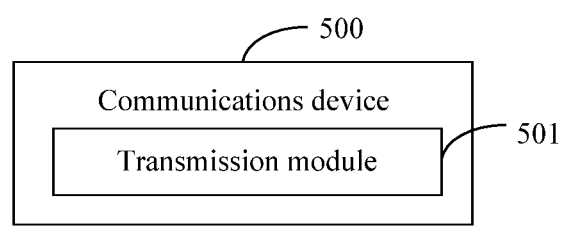
FIG. 5 is a structural diagram of a communications device according to an embodiment of this disclosure.

Referring to FIG. 5, FIG. 5 is a structural diagram of a communications device according to an embodiment of this disclosure. As shown in FIG. 5, the communications device 500 includes a transmission module 501.

The transmission module 501 is configured to transmit a message in a random access process by using a target beam in selectable beams.

The message in the random access process is an Msg1, an Msg2, an Msg3, or an Msg4.

In this embodiment of this disclosure, the communications device 500 may be a terminal device, or may be a network device.

Optionally, when the message is the Msg1, the selectable beams include a first beam and/or a second beam.

The first beam is an uplink beam that has an associative relationship with a downlink beam whose quality of a received downlink reference signal is better than a first threshold.

The second beam is an uplink beam that has an associative relationship with a downlink beam configured in a dedicated radio resource control RRC message.

Optionally, when the message is the Msg2, the selectable beams include at least one of a third beam, a fourth beam, a fifth beam and a sixth beam.

The third beam is a downlink beam that has an associative relationship with an uplink beam sending the Msg1.

The fourth beam is a downlink beam that has a quasi co-location QCL relationship with a downlink beam whose quality of a received downlink reference signal is better than a first threshold.

The fifth beam is a downlink beam that is the same as the downlink beam whose quality of the received downlink reference signal is better than the first threshold.

The sixth beam is a downlink beam configured in a dedicated radio resource control RRC message.

Optionally, the target beam is the sixth beam when the sixth beam is usable and has an associative relationship with the uplink beam sending the Msg1, or when the sixth beam is usable and has a QCL relationship with the downlink beam whose quality of the received downlink reference signal is better than the first threshold, or when the sixth beam is usable and is the same as the downlink beam whose quality of the received downlink reference signal is better than the first threshold; otherwise, the target beam is the third beam, the fourth beam, or the fifth beam.

Optionally, when the message is the Msg3, the selectable beams include at least one of a seventh beam, an eighth beam, a ninth beam, a tenth beam, an eleventh beam, and a twelfth beam.

The seventh beam is an uplink beam that is the same as an uplink beam sending the Msg1.

The eighth beam is an uplink beam that has a quasi co-location QCL relationship with the uplink beam sending the Msg1.

The ninth beam is an uplink beam indicated in the Msg2.

The tenth beam is an uplink beam that has an associative relationship with a downlink beam configured in a dedicated radio resource control RRC message.

The eleventh beam is an uplink beam configured in the dedicated radio resource control RRC message.

The twelfth beam is an uplink beam that has an associative relationship with a downlink beam receiving the Msg2.

Optionally, when the message is the Msg4, the selectable beams include at least one of a third beam, a fourth beam, a fifth beam, a sixth beam, a thirteenth beam, a fourteenth beam, a fifteenth beam, a sixteenth beam, and a seventeenth beam.

The third beam is a downlink beam that has an associative relationship with an uplink beam sending the Msg1.

The fourth beam is a downlink beam that has a quasi co-location QCL relationship with a downlink beam whose quality of a received downlink reference signal is better than a first threshold.

The fifth beam is a downlink beam that is the same as the downlink beam whose quality of the received downlink reference signal is better than the first threshold.

The sixth beam is a downlink beam configured in a dedicated radio resource control RRC message.

The thirteenth beam is a downlink beam indicated in the Msg2.

The fourteenth beam is a downlink beam receiving the Msg2.

The fifteenth beam is a downlink beam that has a quasi co-location QCL relationship with the downlink beam receiving the Msg2.

The sixteenth beam is a downlink beam that has an associative relationship with an uplink beam sending the Msg3.

The seventeenth beam is a downlink beam that has an associative relationship with an uplink beam configured in the dedicated radio resource control RRC message.

Optionally, the target beam is the sixth beam when the sixth beam is usable and has an associative relationship with the uplink beam sending the Msg1, or when the sixth beam is usable and has a QCL relationship with the downlink beam whose quality of the received downlink reference signal is better than the first threshold, or when the sixth beam is usable and is the same as the downlink beam whose quality of the received downlink reference signal is better than the first threshold; otherwise, the target beam is the third beam, the fourth beam, the fifth beam, the thirteenth beam, the fourteenth beam, the fifteenth beam, the sixteenth beam, or the seventeenth beam.

Optionally, the target beam is a usable highest-priority beam in the selectable beams.

Optionally, the selectable beams include a beam indicated to the terminal device by the network device by using the Msg2.

Optionally, the selectable beams include a beam determined based on a beam that is configured for the terminal device by the network device by using a dedicated radio resource control RRC message.

The communications device 500 provided in this embodiment of this disclosure is capable of implementing processes that are implemented by the communications device in the method embodiment of FIG. 4. To avoid repetition, details are not described herein again.

In the communications device 500 in this embodiment of this disclosure, the transmission module 501 is configured to transmit the message in the random access process by using the target beam in the selectable beams, where the message in the random access process is the Msg1, the Msg2, the Msg3, or the Msg4, thereby implementing beam-based transmission of messages in the random access process, and regulating beam selection for receiving and sending the messages in the random access process.

Figure 6:
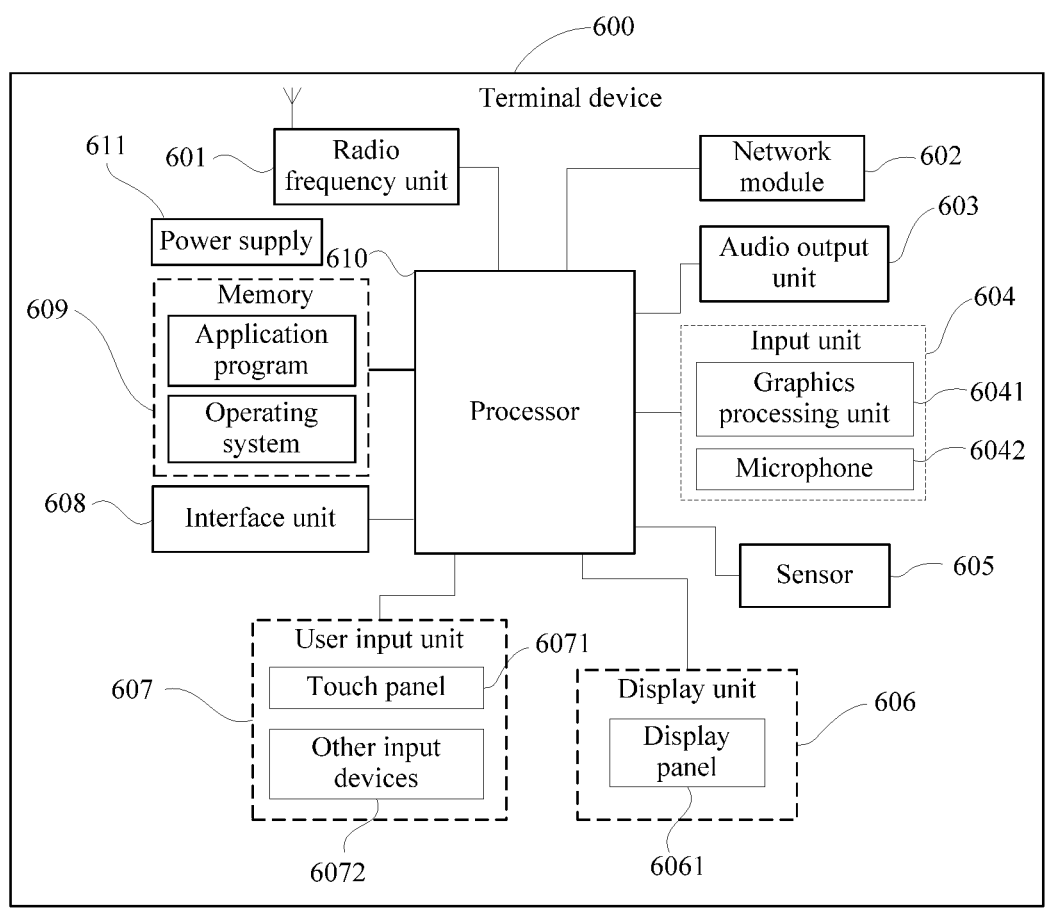
FIG. 6 is a structural diagram of a terminal device according to an embodiment of this disclosure.

FIG. 6 is a structural diagram of a terminal device according to an embodiment of this disclosure. Referring to FIG. 6, the terminal device 600 includes but is not limited to components such as a radio frequency unit 601, a network module 602, an audio output unit 603, an input unit 604, a sensor 605, a display unit 606, a user input unit 607, an interface unit 608, a memory 609, a processor 610, and a power supply 611. Persons skilled in the art can understand that the structure of the terminal device shown in FIG. 6 does not constitute any limitation on the terminal device, and the terminal device may include more or fewer components than those shown in the figure, or a combination of some of the components, or a different arrangement of the components. In this embodiment of this disclosure, the terminal device includes but is not limited to a mobile phone, a tablet computer, a laptop computer, a palmtop computer, an in-vehicle terminal, a wearable device, a pedometer, and the like.

The radio frequency unit 601 is configured to transmit a message in a random access process by using a target beam in selectable beams, where the message in the random access process is an Msg1, an Msg2, an Msg3, or an Msg4.

In this embodiment of this disclosure, transmitting the message in the random access process by using the target beam in the selectable beams can implement beam-based transmission of messages in the random access process, thereby regulating beam selection for receiving and sending the messages in the random access process.

Optionally, when the message is the Msg1, the selectable beams include a first beam and/or a second beam.

The first beam is an uplink beam that has an associative relationship with a downlink beam whose quality of a received downlink reference signal is better than a first threshold.

The second beam is an uplink beam that has an associative relationship with a downlink beam configured in a dedicated radio resource control RRC message.

Optionally, when the message is the Msg2, the selectable beams include at least one of a third beam, a fourth beam, a fifth beam and a sixth beam.

The third beam is a downlink beam that has an associative relationship with an uplink beam sending the Msg1.

The fourth beam is a downlink beam that has a quasi co-location QCL relationship with a downlink beam whose quality of a received downlink reference signal is better than a first threshold.

The fifth beam is a downlink beam that is the same as the downlink beam whose quality of the received downlink reference signal is better than the first threshold.

The sixth beam is a downlink beam configured in a dedicated radio resource control RRC message.

Optionally, the target beam is the sixth beam when the sixth beam is usable and has an associative relationship with the uplink beam sending the Msg1, or when the sixth beam is usable and has a QCL relationship with the downlink beam whose quality of the received downlink reference signal is better than the first threshold, or when the sixth beam is usable and is the same as the downlink beam whose quality of the received downlink reference signal is better than the first threshold; otherwise, the target beam is the third beam, the fourth beam, or the fifth beam.

Optionally, when the message is the Msg3, the selectable beams include at least one of a seventh beam, an eighth beam, a ninth beam, a tenth beam, an eleventh beam, and a twelfth beam.

The seventh beam is an uplink beam that is the same as an uplink beam sending the Msg1.

The eighth beam is an uplink beam that has a quasi co-location QCL relationship with the uplink beam sending the Msg1.

The ninth beam is an uplink beam indicated in the Msg2.

The tenth beam is an uplink beam that has an associative relationship with a downlink beam configured in a dedicated radio resource control RRC message.

The eleventh beam is an uplink beam configured in the dedicated radio resource control RRC message.

The twelfth beam is an uplink beam that has an associative relationship with a downlink beam receiving the Msg2.

Optionally, when the message is the Msg4, the selectable beams include at least one of a third beam, a fourth beam, a fifth beam, a sixth beam, a thirteenth beam, a fourteenth beam, a fifteenth beam, a sixteenth beam, and a seventeenth beam.

The third beam is a downlink beam that has an associative relationship with an uplink beam sending the Msg1.

The fourth beam is a downlink beam that has a quasi co-location QCL relationship with a downlink beam whose quality of a received downlink reference signal is better than a first threshold.

The fifth beam is a downlink beam that is the same as the downlink beam whose quality of the received downlink reference signal is better than the first threshold.

The sixth beam is a downlink beam configured in a dedicated radio resource control RRC message.

The thirteenth beam is a downlink beam indicated in the Msg2.

The fourteenth beam is a downlink beam receiving the Msg2.

The fifteenth beam is a downlink beam that has a quasi co-location QCL relationship with the downlink beam receiving the Msg2.

The sixteenth beam is a downlink beam that has an associative relationship with an uplink beam sending the Msg3.

The seventeenth beam is a downlink beam that has an associative relationship with an uplink beam configured in the dedicated radio resource control RRC message.

Optionally, the target beam is the sixth beam when the sixth beam is usable and has an associative relationship with the uplink beam sending the Msg1, or when the sixth beam is usable and has a QCL relationship with the downlink beam whose quality of the received downlink reference signal is better than the first threshold, or when the sixth beam is usable and is the same as the downlink beam whose quality of the received downlink reference signal is better than the first threshold; otherwise, the target beam is the third beam, the fourth beam, the fifth beam, the thirteenth beam, the fourteenth beam, the fifteenth beam, the sixteenth beam, or the seventeenth beam.

Optionally, the target beam is a usable highest-priority beam in the selectable beams.

Optionally, the selectable beams include a beam indicated to the terminal device by the network device by using the Msg2.

Optionally, the selectable beams include a beam determined based on a beam that is configured for the terminal device by the network device by using a dedicated radio resource control RRC message.

It should be understood that in an embodiment of this disclosure, the radio frequency unit 601 may be configured to: receive and send signals in an information receiving/sending process or a call process; and specifically, after receiving downlink data from a base station, send the downlink information to the processor 610 for processing, and in addition, send uplink data to the base station. Usually, the radio frequency unit 601 includes but is not limited to an antenna, at least one amplifier, a transceiver, a coupler, a low noise amplifier, a duplexer, and the like. In addition, the radio frequency unit 601 may further communicate with a network and another device through a wireless communications system. The terminal device provides a user with wireless broadband internet access through the network module 602, for example, helping the user to send or receive an e-mail, to browse a web page, or to access streaming media.

The audio output unit 603 may convert audio data received by the radio frequency unit 601 or the network module 602 or stored in the memory 609 into an audio signal and output the audio signal as a sound. Furthermore, the audio output unit 603 may also provide audio output (for example, a call signal received sound or a message received sound) related to a specific function performed by the terminal device 600. The audio output unit 603 includes a speaker, a buzzer, a receiver, and the like.

The input unit 604 is configured to receive an audio or video signal. The input unit 604 may include a graphics processing unit (Graphics Processing Unit, GPU) 6041 and a microphone 6042, and the graphics processing unit 6041 processes image data of a still picture or a video obtained by an image capture apparatus (for example, a camera) in an image capture mode or a video capture mode. A processed image frame may be displayed on the display unit 606. An image frame processed by the graphics processing unit 6041 may be stored in the memory 609 (or other storage media) or sent by the radio frequency unit 601 or the network module 602. The microphone 6042 can receive a sound and can process the sound into audio data. The processed audio data can be converted into a format that can be sent to a mobile communication base station through the radio frequency unit 601 in a telephone call mode, for outputting.

The terminal device 600 further includes at least one sensor 605, such as an optical sensor, a motion sensor, and other sensors. Specifically, the optical sensor includes an ambient light sensor and a proximity sensor. The ambient light sensor may adjust luminance of the display panel 6061 based on brightness of ambient light. The proximity sensor may turn off the display panel 6061 and/or backlight when the terminal device 600 is moved to an ear. As a type of motion sensor, an accelerometer sensor can detect magnitudes of accelerations in all directions (usually three axes), can detect a magnitude and a direction of gravity when the mobile phone is in a static state, and can be applied to terminal device posture recognition (such as screen switching between portrait and landscape, related games, and magnetometer posture calibration), functions related to vibration recognition (such as pedometer and tapping), and the like. The sensor 605 may also include a fingerprint sensor, a pressure sensor, an iris sensor, a molecular sensor, a gyroscope, a barometer, a hygrometer, a thermometer, an infrared sensor, and the like. Details are not described herein.

The display unit 606 is configured to display information input by the user or information provided for the user. The display unit 606 may include a display panel 6061, and the display panel 6061 may be configured in a form of a liquid crystal display (Liquid Crystal Display, LCD), an organic light-emitting diode (Organic Light-Emitting Diode, OLED), or the like.

The user input unit 607 may be configured to receive input digital or character information and generate key signal input related to user setting and function control of the terminal device. Specifically, the user input unit 607 may include a touch panel 6071 and other input devices 6072. The touch panel 6071, also referred to as a touchscreen, may capture a touch operation performed by a user on or near the touch panel (for example, an operation performed by the user on the touch panel 6071 or near the touch panel 6071 by using any appropriate object or accessory such as a finger or a stylus). The touch panel 6071 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information to point coordinates, and sends the point coordinates to the processor 610, and receives and executes a command sent by the processor 610. In addition, the touch panel 6071 may be implemented in a plurality of forms, for example, as a resistive, capacitive, infrared, or surface acoustic wave touch panel. The user input unit 607 may further include other input devices 6072 in addition to the touch panel 6071. Specifically, the other input devices 6072 may include but are not limited to a physical keyboard, a function key (such as a volume control key or a power on/off key), a trackball, a mouse, and a joystick. Details are not described herein.

Further, the touch panel 6071 may cover the display panel 6061. After detecting a touch operation on or near the touch panel 6071, the touch panel 6071 transmits information about the touch operation to the processor 610 for the processor 610 to determine a touch event type, and then the processor 610 provides a corresponding visual output on the display panel 6061 based on the touch event type. Although in FIG. 6, the touch panel 6071 and the display panel 6061 act as two independent parts to implement input and output functions of the terminal device, in some embodiments, the touch panel 6071 and the display panel 6061 may be integrated to implement the input and output functions of the terminal device. This is not specifically limited herein.

The interface unit 608 is an interface connecting an external apparatus to the terminal device 600. For example, the external apparatus may include a wired or wireless headphone port, an external power (or battery charger) port, a wired or wireless data port, a memory card port, a port for connecting an apparatus provided with a recognition module, an audio input/output (I/O) port, a video I/O port, an earphone port, and the like. The interface unit 608 may be configured to: receive input (for example, data information and power) from the external apparatus, and transmit the received input to one or more elements in the terminal device 600, or may be configured to transmit data between the terminal device 600 and the external apparatus.

The memory 609 may be configured to store a software program and various data. The memory 609 may mainly include a program storage area and a data storage area. The program storage area may store an operating system, an application program required for at least one function (such as a sound play function and an image play function), and the like. The data storage area may store data created based on use of the mobile phone (such as audio data and a phone book), and the like. In addition, the memory 609 may include a high-speed random access memory, or may include a non-volatile memory, for example, at least one magnetic disk storage device, a flash memory device, or other volatile solid-state storage devices.

The processor 610 is a control center of the terminal device, and is connected to all components of the terminal device by using various interfaces and lines. By running or executing a software program and/or module that is stored in the memory 609 and calling data stored in the memory 609, the processor 610 executes various functions of the terminal device and processes data, so as to perform overall monitoring on the terminal device. The processor 610 may include one or more processing units. Optionally, an application processor and a modem processor may be integrated into the processor 610. The application processor mainly processes an operating system, a user interface, an application program, and the like. The modem processor mainly processes wireless communication. It can be understood that the modem processor may alternatively not be integrated in the processor 610.

The terminal device 600 may further include the power supply 611 (such as a battery) for supplying power to all components. Optionally, the power supply may be logically connected to the processor 610 through a power management system. In this way, functions such as charge management, discharge management, and power consumption management are implemented by using the power management system.

In addition, the terminal device 600 includes some functional modules that are not shown, details of which are not described herein.

Optionally, an embodiment of this disclosure further provides a terminal device, including a processor 610, a memory 609, and a computer program stored in the memory 609 and capable of running on the processor 610. When the computer program is executed by the processor 610, the processes of the random access method embodiment are implemented, with the same technical effect achieved. To avoid repetition, details are not described herein again.

An embodiment of this disclosure further provides a computer-readable storage medium. The computer-readable storage medium stores a computer program, and when the computer program is executed by a processor, the processes of the random access method embodiments are implemented, with the same technical effect achieved. To avoid repetition, details are not described herein again. The computer-readable storage medium is, for example, a read-only memory (Read-Only Memory, ROM), a random access memory (Random Access Memory, RAM), a magnetic disk, or an optical disc.

Figure 7:
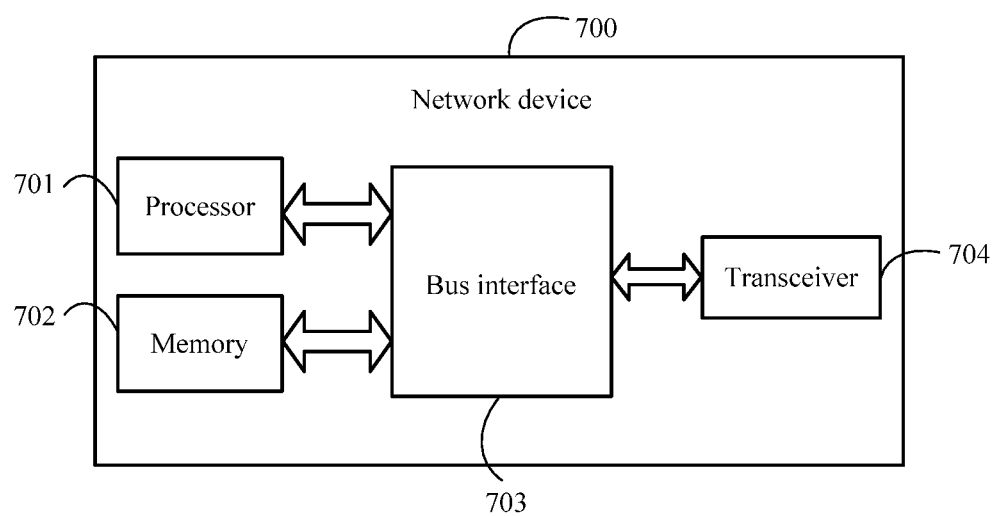
FIG. 7 is a structural diagram of a network device according to an embodiment of this disclosure.

Referring to FIG. 7, FIG. 7 is a structural diagram of a network device according to an embodiment of this disclosure. As shown in FIG. 7, the network device 700 includes a processor 701, a memory 702, a bus interface 703, and a transceiver 704. The processor 701, the memory 702, and the transceiver 704 are all connected to the bus interface 703.

In this embodiment of this disclosure, the network device 700 further includes a computer program stored in the memory 702 and capable of running on the processor 701.

When the computer program is executed by the processor 701, the following step is implemented:

transmitting a message in a random access process by using a target beam in selectable beams.

The message in the random access process is an Msg1, an Msg2, an Msg3, or an Msg4.

Optionally, when the message is the Msg1, the selectable beams include a first beam and/or a second beam.

The first beam is an uplink beam that has an associative relationship with a downlink beam whose quality of a received downlink reference signal is better than a first threshold.

The second beam is an uplink beam that has an associative relationship with a downlink beam configured in a dedicated radio resource control RRC message.

Optionally, when the message is the Msg2, the selectable beams include at least one of a third beam, a fourth beam, a fifth beam and a sixth beam.

The third beam is a downlink beam that has an associative relationship with an uplink beam sending the Msg1.

The fourth beam is a downlink beam that has a quasi co-location QCL relationship with a downlink beam whose quality of a received downlink reference signal is better than a first threshold.

The fifth beam is a downlink beam that is the same as the downlink beam whose quality of the received downlink reference signal is better than the first threshold.

The sixth beam is a downlink beam configured in a dedicated radio resource control RRC message.

Optionally, the target beam is the sixth beam when the sixth beam is usable and has an associative relationship with the uplink beam sending the Msg1, or when the sixth beam is usable and has a QCL relationship with the downlink beam whose quality of the received downlink reference signal is better than the first threshold, or when the sixth beam is usable and is the same as the downlink beam whose quality of the received downlink reference signal is better than the first threshold; otherwise, the target beam is the third beam, the fourth beam, or the fifth beam.

Optionally, when the message is the Msg3, the selectable beams include at least one of a seventh beam, an eighth beam, a ninth beam, a tenth beam, an eleventh beam, and a twelfth beam.

The seventh beam is an uplink beam that is the same as an uplink beam sending the Msg1.

The eighth beam is an uplink beam that has a quasi co-location QCL relationship with the uplink beam sending the Msg1.

The ninth beam is an uplink beam indicated in the Msg2.

The tenth beam is an uplink beam that has an associative relationship with a downlink beam configured in a dedicated radio resource control RRC message.

The eleventh beam is an uplink beam configured in the dedicated radio resource control RRC message.

The twelfth beam is an uplink beam that has an associative relationship with a downlink beam receiving the Msg2.

Optionally, when the message is the Msg4, the selectable beams include at least one of a third beam, a fourth beam, a fifth beam, a sixth beam, a thirteenth beam, a fourteenth beam, a fifteenth beam, a sixteenth beam, and a seventeenth beam.

The third beam is a downlink beam that has an associative relationship with an uplink beam sending the Msg1.

The fourth beam is a downlink beam that has a quasi co-location QCL relationship with a downlink beam whose quality of a received downlink reference signal is better than a first threshold.

The fifth beam is a downlink beam that is the same as the downlink beam whose quality of the received downlink reference signal is better than the first threshold.

The sixth beam is a downlink beam configured in a dedicated radio resource control RRC message.

The thirteenth beam is a downlink beam indicated in the Msg2.

The fourteenth beam is a downlink beam receiving the Msg2.

The fifteenth beam is a downlink beam that has a quasi co-location QCL relationship with the downlink beam receiving the Msg2.

The sixteenth beam is a downlink beam that has an associative relationship with an uplink beam sending the Msg3.

The seventeenth beam is a downlink beam that has an associative relationship with an uplink beam configured in the dedicated radio resource control RRC message.

Optionally, the target beam is the sixth beam when the sixth beam is usable and has an associative relationship with the uplink beam sending the Msg1, or when the sixth beam is usable and has a QCL relationship with the downlink beam whose quality of the received downlink reference signal is better than the first threshold, or when the sixth beam is usable and is the same as the downlink beam whose quality of the received downlink reference signal is better than the first threshold; otherwise, the target beam is the third beam, the fourth beam, the fifth beam, the thirteenth beam, the fourteenth beam, the fifteenth beam, the sixteenth beam, or the seventeenth beam.

Optionally, the target beam is a usable highest-priority beam in the selectable beams.

Optionally, the selectable beams include a beam indicated to the terminal device by the network device by using the Msg2.

Optionally, the selectable beams include a beam determined based on a beam that is configured for the terminal device by the network device by using a dedicated radio resource control RRC message.

Optionally, an embodiment of this disclosure further provides a network device, including a processor 701, a memory 702, and a computer program stored in the memory 702 and capable of running on the processor 701. When the computer program is executed by the processor 701, the processes of the random access method embodiment are implemented, with the same technical effect achieved. To avoid repetition, details are not described herein again.

An embodiment of this disclosure further provides a computer readable storage medium, where a computer program is stored in the computer readable storage medium. When the computer program is executed by a processor, the processes of the random access method embodiment are implemented. To avoid repetition, details are not described herein again. The computer-readable storage medium is, for example, a read-only memory (Read-Only Memory, ROM), a random access memory (Random Access Memory, RAM), a magnetic disk, or an optical disc.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . "

does not preclude the existence of other identical elements in the process, method, article, or apparatus that includes the element.

According to the description of the foregoing implementations, a person skilled in the art can clearly understand that the method in the foregoing embodiments may be implemented by software on a necessary universal hardware platform or by hardware only. In most cases, the former is a more preferred implementation. Based on such an understanding, the technical solutions of this disclosure essentially, or the part contributing to the related art may be implemented in a form of a software product. The software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this disclosure.

The embodiments of this disclosure are described above with reference to the accompanying drawings, but this disclosure is not limited to the foregoing implementations. The foregoing implementations are only illustrative rather than restrictive. Inspired by this disclosure, a person of ordinary skill in the art can still derive many variations without departing from the essence of this disclosure and the protection scope of the claims. All these variations shall fall within the protection of this disclosure.

What is claimed is:

1. A random access method, comprising:
   transmitting a message in a random access process by using a target beam in selectable beams, wherein
   the message in the random access process is an Msg1, an Msg2, an Msg3, or an Msg4;
   wherein when the message is the Msg2, the selectable beams comprise at least one of a third beam, a fourth beam, a fifth beam, and a sixth beam;
   the third beam is a downlink beam that has an associative relationship with an uplink beam sending the Msg1;
   the fourth beam is a downlink beam that has a quasi co-location QCL relationship with a downlink beam whose quality of a received downlink reference signal is better than a first threshold;
   the fifth beam is a downlink beam that is the same as the downlink beam whose quality of the received downlink reference signal is better than the first threshold; and
   the sixth beam is a downlink beam configured in a dedicated radio resource control RRC message.

2. The method according to claim 1, wherein when the message is the Msg1, the selectable beams comprise a first beam and/or a second beam;
   the first beam is an uplink beam that has an associative relationship with a downlink beam whose quality of a received downlink reference signal is better than a first threshold; and
   the second beam is an uplink beam that has an associative relationship with a downlink beam configured in a dedicated radio resource control RRC message.

3. The method according to claim 1, wherein the target beam is the sixth beam when the sixth beam is usable and has an associative relationship with the uplink beam sending the Msg1, or when the sixth beam is usable and has a QCL relationship with the downlink beam whose quality of the received downlink reference signal is better than the first threshold, or when the sixth beam is usable and is the same as the downlink beam whose quality of the received downlink reference signal is better than the first threshold; otherwise, the target beam is the third beam, the fourth beam, or the fifth beam.

4. The method according to claim 1, wherein when the message is the Msg3, the selectable beams comprise at least one of a seventh beam, an eighth beam, a ninth beam, a tenth beam, an eleventh beam, and a twelfth beam;
   the seventh beam is an uplink beam that is the same as an uplink beam sending the Msg1;
   the eighth beam is an uplink beam that has a quasi co-location QCL relationship with the uplink beam sending the Msg1;
   the ninth beam is an uplink beam indicated in the Msg2;
   the tenth beam is an uplink beam that has an associative relationship with a downlink beam configured in a dedicated radio resource control RRC message;
   the eleventh beam is an uplink beam configured in the dedicated radio resource control RRC message; and
   the twelfth beam is an uplink beam that has an associative relationship with a downlink beam receiving the Msg2.

5. The method according to claim 1, wherein when the message is the Msg4, the selectable beams comprise at least one of a third beam, a fourth beam, a fifth beam, a sixth beam, a thirteenth beam, a fourteenth beam, a fifteenth beam, a sixteenth beam, and a seventeenth beam;
   the third beam is a downlink beam that has an associative relationship with an uplink beam sending the Msg1;
   the fourth beam is a downlink beam that has a quasi co-location QCL relationship with a downlink beam whose quality of a received downlink reference signal is better than a first threshold;
   the fifth beam is a downlink beam that is the same as the downlink beam whose quality of the received downlink reference signal is better than the first threshold; and
   the sixth beam is a downlink beam configured in a dedicated radio resource control RRC message;
   the thirteenth beam is a downlink beam indicated in the Msg2;
   the fourteenth beam is a downlink beam receiving the Msg2;
   the fifteenth beam is a downlink beam that has a quasi co-location QCL relationship with the downlink beam receiving the Msg2;
   the sixteenth beam is a downlink beam that has an associative relationship with an uplink beam sending the Msg3; and
   the seventeenth beam is a downlink beam that has an associative relationship with an uplink beam configured in the dedicated radio resource control RRC message.

6. The method according to claim 5, wherein the target beam is the sixth beam when the sixth beam is usable and has an associative relationship with the uplink beam sending the Msg1, or when the sixth beam is usable and has a QCL relationship with the downlink beam whose quality of the received downlink reference signal is better than the first threshold, or when the sixth beam is usable and is the same as the downlink beam whose quality of the received downlink reference signal is better than the first threshold; otherwise, the target beam is the third beam, the fourth beam, the fifth beam, the thirteenth beam, the fourteenth beam, the fifteenth beam, the sixteenth beam, or the seventeenth beam.

7. The method according to claim 1, wherein the target beam is a usable highest-priority beam in the selectable beams.

8. The method according to claim 1, wherein the selectable beams comprise a beam indicated to a terminal device by a network device by using the Msg2.

9. The method according to claim 1, wherein the selectable beams comprise a beam determined based on a beam that is configured for a terminal device by a network device by using a dedicated radio resource control RRC message.

10. A communications device, comprising a processor, a memory, and a computer program stored in the memory and capable of running on the processor, wherein the processor is configured to execute the computer program to:
   transmit a message in a random access process by using a target beam in selectable beams, wherein
   the message in the random access process is an Msg1, an Msg2, an Msg3, or an Msg4;
   wherein when the message is the Msg2, the selectable beams comprise at least one of a third beam, a fourth beam, a fifth beam, and a sixth beam;
   the third beam is a downlink beam that has an associative relationship with an uplink beam sending the Msg1;
   the fourth beam is a downlink beam that has a quasi co-location QCL relationship with a downlink beam whose quality of a received downlink reference signal is better than a first threshold;
   the fifth beam is a downlink beam that is the same as the downlink beam whose quality of the received downlink reference signal is better than the first threshold; and
   the sixth beam is a downlink beam configured in a dedicated radio resource control RRC message.

11. The communications device according to claim 10, wherein when the message is the Msg1, the selectable beams comprise a first beam and/or a second beam;
   the first beam is an uplink beam that has an associative relationship with a downlink beam whose quality of a received downlink reference signal is better than a first threshold; and
   the second beam is an uplink beam that has an associative relationship with a downlink beam configured in a dedicated radio resource control RRC message.

12. The communications device according to claim 10, wherein the target beam is the sixth beam when the sixth beam is usable and has an associative relationship with the uplink beam sending the Msg1, or when the sixth beam is usable and has a QCL relationship with the downlink beam whose quality of the received downlink reference signal is better than the first threshold, or when the sixth beam is usable and is the same as the downlink beam whose quality of the received downlink reference signal is better than the first threshold; otherwise, the target beam is the third beam, the fourth beam, or the fifth beam.

13. The communications device according to claim 10, wherein when the message is the Msg3, the selectable beams comprise at least one of a seventh beam, an eighth beam, a ninth beam, a tenth beam, an eleventh beam, and a twelfth beam;
   the seventh beam is an uplink beam that is the same as an uplink beam sending the Msg1;
   the eighth beam is an uplink beam that has a quasi co-location QCL relationship with the uplink beam sending the Msg1;
   the ninth beam is an uplink beam indicated in the Msg2;
   the tenth beam is an uplink beam that has an associative relationship with a downlink beam configured in a dedicated radio resource control RRC message;
   the eleventh beam is an uplink beam configured in the dedicated radio resource control RRC message; and
   the twelfth beam is an uplink beam that has an associative relationship with a downlink beam receiving the Msg2.

14. The communications device according to claim 10, wherein when the message is the Msg4, the selectable beams comprise at least one of a third beam, a fourth beam, a fifth beam, a sixth beam, a thirteenth beam, a fourteenth beam, a fifteenth beam, a sixteenth beam, and a seventeenth beam;
   the third beam is a downlink beam that has an associative relationship with an uplink beam sending the Msg1;
   the fourth beam is a downlink beam that has a quasi co-location QCL relationship with a downlink beam whose quality of a received downlink reference signal is better than a first threshold;
   the fifth beam is a downlink beam that is the same as the downlink beam whose quality of the received downlink reference signal is better than the first threshold; and
   the sixth beam is a downlink beam configured in a dedicated radio resource control RRC message;
   the thirteenth beam is a downlink beam indicated in the Msg2;
   the fourteenth beam is a downlink beam receiving the Msg2;
   the fifteenth beam is a downlink beam that has a quasi co-location QCL relationship with the downlink beam receiving the Msg2;
   the sixteenth beam is a downlink beam that has an associative relationship with an uplink beam sending the Msg3; and
   the seventeenth beam is a downlink beam that has an associative relationship with an uplink beam configured in the dedicated radio resource control RRC message.

15. The communications device according to claim 14, wherein the target beam is the sixth beam when the sixth beam is usable and has an associative relationship with the uplink beam sending the Msg1, or when the sixth beam is usable and has a QCL relationship with the downlink beam whose quality of the received downlink reference signal is better than the first threshold, or when the sixth beam is usable and is the same as the downlink beam whose quality of the received downlink reference signal is better than the first threshold; otherwise, the target beam is the third beam, the fourth beam, the fifth beam, the thirteenth beam, the fourteenth beam, the fifteenth beam, the sixteenth beam, or the seventeenth beam.

16. The communications device according to claim 10, wherein the target beam is a usable highest-priority beam in the selectable beams.

17. The communications device according to claim 10, wherein the selectable beams comprise a beam indicated to a terminal device by a network device by using the Msg2.

18. The communications device according to claim 10, wherein the selectable beams comprise a beam determined based on a beam that is configured for a terminal device by a network device by using a dedicated radio resource control RRC message.

19. A non-transitory computer-readable storage medium, storing a computer program, wherein when the computer program is executed by a processor, the following steps are implemented:
   transmitting a message in a random access process by using a target beam in selectable beams, wherein
   the message in the random access process is an Msg1, an Msg2, an Msg3, or an Msg4;
   wherein when the message is the Msg2, the selectable beams comprise at least one of a third beam, a fourth beam, a fifth beam, and a sixth beam;

the third beam is a downlink beam that has an associative relationship with an uplink beam sending the Msg1;

the fourth beam is a downlink beam that has a quasi co-location QCL relationship with a downlink beam whose quality of a received downlink reference signal is better than a first threshold;

the fifth beam is a downlink beam that is the same as the downlink beam whose quality of the received downlink reference signal is better than the first threshold; and the sixth beam is a downlink beam configured in a dedicated radio resource control RRC message.

20. The non-transitory computer-readable storage medium according to claim 19, wherein when the message is the Msg1, the selectable beams comprise a first beam and/or a second beam;

the first beam is an uplink beam that has an associative relationship with a downlink beam whose quality of a received downlink reference signal is better than a first threshold; and the second beam is an uplink beam that has an associative relationship with a downlink beam configured in a dedicated radio resource control RRC message.

\* \* \* \* \*